(12) United States Patent
Fritz et al.

(10) Patent No.: US 8,849,634 B2
(45) Date of Patent: Sep. 30, 2014

(54) METHOD FOR IDENTIFYING THE MAXIMAL PACKING DENSITY OF SHIFTING-TILES AUTOMATED WAREHOUSES

(75) Inventors: Christian Fritz, Palo Alto, CA (US);
Minh Binh Do, Palo Alto, CA (US);
Serdar Uckun, Palo Alto, CA (US)

(73) Assignee: Palo Alto Research Center Incorporation, Palo Alto, CA (US)

( * ) Notice: Subject to any disclaimer, the term of this patent is extended or adjusted under 35 U.S.C. 154(b) by 286 days.

(21) Appl. No.: 13/363,693

(22) Filed: Feb. 1, 2012

(65) Prior Publication Data

US 2013/0197869 A1 Aug. 1, 2013

(51) Int. Cl.
*G06G 7/48* (2006.01)

(52) U.S. Cl.
USPC ............................................. 703/6; 700/214

(58) Field of Classification Search
CPC ......... G06Q 10/08; G06Q 50/28; G06K 7/10; G06K 19/06; B65G 1/0407
USPC .............. 703/1, 6, 7; 414/267, 270, 277, 280, 414/286, 139.9, 807; 700/214, 217, 216; 705/28, 27.1; 104/118; 360/92.1
See application file for complete search history.

(56) References Cited

U.S. PATENT DOCUMENTS

| | | | |
|---|---|---|---|
| 4,422,554 A | | 12/1983 | Lichti |
| 5,508,859 A | * | 4/1996 | Hu et al. ...................... 360/92.1 |
| 5,749,693 A | * | 5/1998 | Hanaya ......................... 414/277 |
| 6,026,378 A | * | 2/2000 | Onozaki ......................... 705/28 |
| 6,139,240 A | * | 10/2000 | Ando ............................ 414/267 |
| 6,315,513 B1 | * | 11/2001 | Harukawa et al. ............ 414/286 |
| 6,718,228 B2 | * | 4/2004 | Campbell et al. ............. 700/214 |
| 7,168,905 B1 | | 1/2007 | Solomon et al. |
| 7,591,630 B2 | * | 9/2009 | Lert, Jr. ......................... 414/807 |
| 8,195,532 B2 | * | 6/2012 | Zwerger et al. ................ 705/28 |
| 2006/0045660 A1 | * | 3/2006 | Di Rosa ..................... 414/139.9 |
| 2008/0118335 A1 | * | 5/2008 | Ishida et al. .................. 414/280 |
| 2009/0082902 A1 | * | 3/2009 | Foltz et al. .................... 700/214 |
| 2009/0245985 A1 | * | 10/2009 | Matsuba ....................... 414/270 |
| 2010/0031845 A1 | * | 2/2010 | Cardoni ........................ 104/118 |
| 2010/0076591 A1 | * | 3/2010 | Lert, Jr. ........................ 700/216 |
| 2011/0106296 A1 | * | 5/2011 | Stevens et al. ................ 700/217 |
| 2012/0143726 A1 | * | 6/2012 | Chirnomas .................. 705/27.1 |

FOREIGN PATENT DOCUMENTS

EP 0272340 B1 7/1991

OTHER PUBLICATIONS

Johnson M.E., "The Joint Modular Intermodal Container, is this the future of Naval Logistics?", Massachusetts Institute of Technology, Jun. 2005.*
Whelan et al.., "Automated Packing Systems—A Systems Engineering Approach", IEEE Transactions on Systems, Man and Cybernetics, 1996.*
Higgins et al., "Comparison of attributes and characteristics of strategic ports to agile port models", University of Southern California, 1999.*

(Continued)

*Primary Examiner* — Kandasamy Thangavelu
(74) *Attorney, Agent, or Firm* — Fay Sharpe LLP

(57) ABSTRACT

A warehouse management system including a layout module which determines a layout of the automated warehouse, the layout including at least one occupied cell and at least one blank cell and an analysis module which analyzes the layout of the automated warehouse to determine a minimum number of blank cells required to retrieve an object from all of the occupied cells in the warehouse.

19 Claims, 5 Drawing Sheets

(56) References Cited

OTHER PUBLICATIONS

Bleifus et al., "A case study on simulation and emulation of a new case picking system for a us based wholesaler", Proceedings of the 2012 Winter Simulation Conference, 2012.*
Chow et al., "Analysis of manufacturing systems by the Research Queueing Package", IBM J. Res. Develop. VOl. 29 No. 4, Jul. 1985.*
Ting et al., "Optimal Bidirectional Spine Layout for Overhead Material Handling Systems", IEEE Transactions on Semiconductor Manufacturing, vol. 14, Feb. 2001.*
Britt, D., "Automated cold stores", Cold and Chilled Storage Technology, 1997.*

* cited by examiner

METHOD FOR IDENTIFYING THE MAXIMAL PACKING DENSITY OF SHIFTING-TILES AUTOMATED WAREHOUSES

BACKGROUND

The present exemplary embodiment relates generally to warehouse management systems. It finds particular application in conjunction with identifying the maximal packing density in shifting-tiles automated warehouse and will be described with particular reference thereto. However, it is to be understood that it also finds application in other usage scenarios and is not necessarily limited to the aforementioned application.

Automated warehouses play an increasingly important role in logistics. The current best practice is to design such warehouses in a way where shelves are interleaved with shafts for cranes that can load and unload pallets from the shelves. While this makes controlling the warehouse relatively easy, it does not achieve a very high storage density as one third of the volume of the warehouse is typically required for the crane structure.

One way to improve on this practice is with the addition of pallet moving facilities on the shelves themselves which allows for multi-layer storage of pallets on shelves (or floors). In such a design, the warehouse utilizes shifting-tile floors where each floor consists of a two-dimensional grid of cells, each of which can hold a pallet and can move it to any adjacent cell unless there is a wall between them. The warehouse also includes an elevator located in at least one of the cells connecting the floor with both the loading/unloading port of the warehouse and other floors. Such a design only requires minimal space for the elevator. For instance, on a floor layout with 400 cells and only one elevator, only 1/400th of the space is required for the elevator, increasing the packing density of the warehouse by almost 50% compared to the current best practice.

For example, an automated warehouse including a grid of floor tiles can store and move pallets in a north-south direction and east-west direction. This allows the automated warehouse to achieve a higher packing density. However, to achieve this high packing density, the warehouse needs to be analyzed to determine how densely the pallets can be packed while still ensuring that every pallet can be retrieved. This is made more complicated by the existence of additional constraints, such as walls blocking some movements.

In order to retrieve a pallet from such a warehouse, in most cases, a number of pallets need to be moved around so that the target pallet can reach the elevator. Once there, the pallet can be moved to the loading/unloading port of the warehouse. Whether or not a specific pallet can be moved to the elevator or not depends on 1) the layout of the floor in terms of walls blocking pallets from moving between certain adjacent cells and 2) the number of blank cells on the floor. For instance, if all the cells on a floor are occupied by pallets, only the pallet that is currently on the elevator can be retrieved. As such, a need exists to determine an optimal shifting-tiles floor layout which enables all of the pallets to be retrieved.

The present disclosure provides a new and improved system and method which overcome the above-referenced problems and others.

BRIEF DESCRIPTION

In accordance with one aspect of the present disclosure, a method for determining a maximum packing density of an automated warehouse is provided. The method includes determining a layout of the automated warehouse, the layout including a plurality of cells, analyzing the layout of the automated warehouse utilizing an automated process to identify the maximum packing density of the layout, and displaying the maximum packing density of the layout.

In accordance with another aspect of the present disclosure, a warehouse management system is provided. The system including a layout module which determines a layout of the automated warehouse, the layout including at least one occupied cell and at least one blank cell and an analysis module which analyzes the layout of the automated warehouse to determine a minimum number of blank cells required to retrieve an object from all of the occupied cells in the warehouse.

In accordance with another aspect of the present disclosure, a warehouse management system is provided. The system includes a plurality of shifting-tile cells, the plurality of cells including at least one occupied cell, a layout module which determines a layout of the plurality of cells, and an analysis module which analyzes the layout of the plurality of cells to determine a minimum number of blank cells required to retrieve an object from all of the at least one occupied cell in the warehouse.

DETAILED DESCRIPTION

The exemplary embodiment provides a method for determining an optimal shifting-tiles floor layout in an automated warehouse which includes determining the minimal number of blanks cells required to retrieve all of the pallets in the warehouse. The advantage of this method is its efficiency and its accuracy of the number of blank cells required to retrieve all the pallets within the warehouse. The method ensures the determined number of blanks required for a given cell is indeed minimal and sufficient. For example, if the optimal shifting-tile floor layout requires the number of blanks to be K, then all of the pallets could be retrieved if K blank cells are available on the floor. As such, the method ensures that all pallets are retrievable while a certain packing density is not trespassed and optimal usage of warehouse capacity is achieved.

In the discussion which follows, the system and method will be described in terms of a warehouse management system and method; however, it is to be appreciated that the system may be utilized in other applications, in particular, marine port management systems, train depot management system, and the like.

Figure 1:
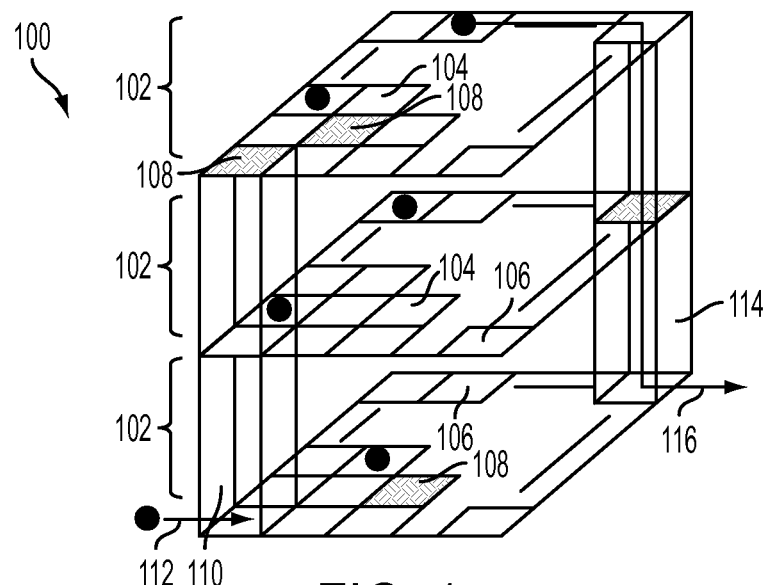
FIG. 1 is a graphical illustration of a shifting-tiles automated warehouse according to aspects of the present disclosure.

With reference to FIG. 1, a shifting-tiles automated warehouse 100 includes a plurality of floors 102 which each consist of a two-dimensional grid of cells 104. While only three floors are illustrated, more or less floors are contemplated. Each cell can store and move pallets in each of the two-dimensional directions of the grid. Specifically, each of the floors 102 includes shifting-tiles which enable any occupied cell 106 to move a pallet to any adjacent blank cell 108 via conveyer belt and the like. Although a certain number of occupied and blank cells are illustrated, it should be appreciated that each of the floors includes more or less occupied cells and blanks cells. At least one of the cells of each floor includes at least one elevator connecting the floor with both the loading and unloading port of the warehouse and other floors. As illustrated, warehouse 100 includes two separate elevators, a loading elevator 110 which connects the floors with the loading port 112 of the warehouse 100 and an unloading elevator 114 which connects the floors with the unloading port 116 of the warehouse 100. It should be appreciated that the warehouse includes more or less elevators, and more or less loading and unloading ports. It should also be contemplated that a single unloading/loading elevator connects the floors to a single unloading/loading port. Typically, in order to retrieve a particular target pallet from the warehouse 100, a number of other pallets need to be moved such that the target pallet can reach the unloading elevator 114 and ultimately the unloading port 116 of the warehouse 110. In order to retrieve all of the pallets within the warehouse, the shifting-tile floor plans require a particular number of blank cells 108. As mentioned above, determining whether a target pallet can be moved to the elevator depends on the layout of the floor in terms of walls blocking pallets from moving between certain adjacent cells and the number of blank cells on the floor.

Figure 2:
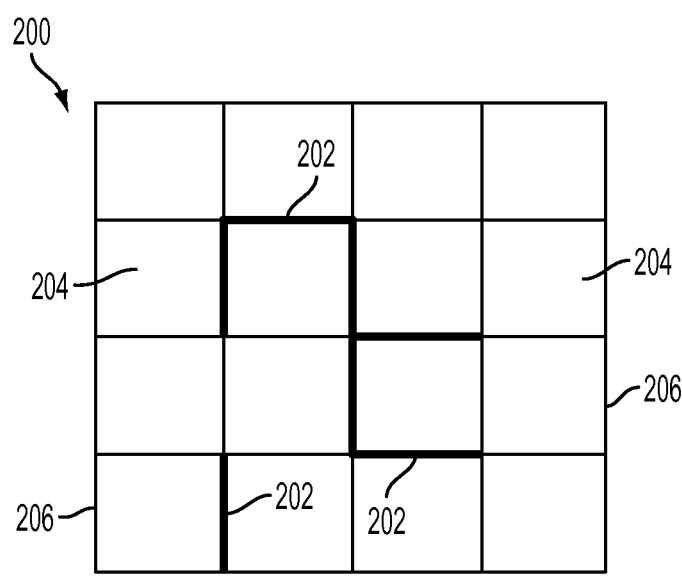
FIG. 2 is an exemplary illustration of a floor plan of a shifting-tiles automated warehouse.

With reference to FIG. 2, an exemplary floor plan 200 of the shifting-tiles automated warehouse 100 is illustrated. The floor plan 200 includes 16 total cells 204 in a four by four cell layout. The floor plan 200 also includes a plurality of internal walls 202 indicated by the bold lines in addition to a plurality of external walls 206 of the warehouse 100. As described above, shifting-tiles in each cell 104 enables any occupied cell to move a pallet to any adjacent blank cell unless there is a wall between them. To facilitate the movement of pallets, the shifting tiles include conveyer belts, carousels, and the like. It should be appreciated that at least one of the cells includes an elevator to enable access to the other floors and the unloading/loading port of the warehouse. It should be contemplated that each floor includes more or less cells in various layouts, more or less internal walls, and more or less external walls.

Figure 3:
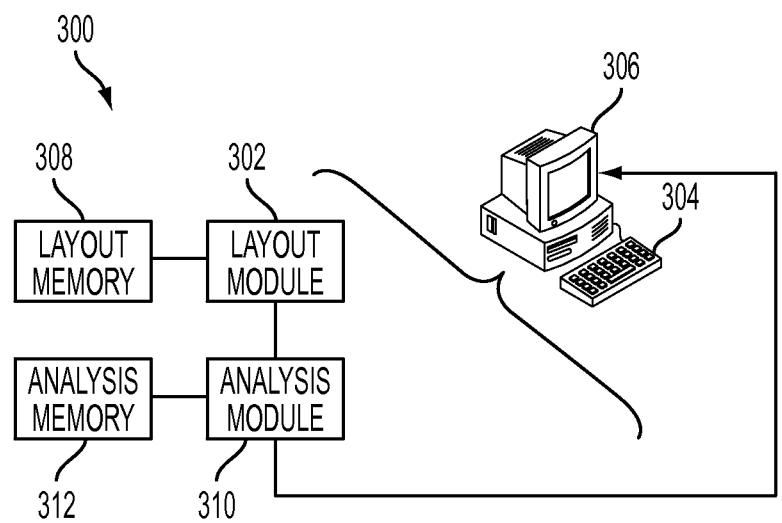
FIG. 3 is a block diagram of a warehouse management system according to aspect of the present disclosure.

With reference to FIG. 3, a warehouse management system 300 determines the optimal number of blank cells required to achieve the maximum packing density while ensuring that every pallet within the warehouse can be retrieved. The warehouse management system 300 includes a layout module 302 which generates or determines the layout of the floor or space of the warehouse including any obstruction or walls within the layout. The layout module 302 also generates or determines any loading or unloading locations including the locations of any elevators and/or loading and unloading ports of the warehouse. The layout module 302 may generate or determine the layout of the floor or space of the warehouse based on manual input and/or automatically. As to the former, the layout module 302 is associated with a user which controls the generation or determination of the layout. To facilitate the user generation or determination of the layout, the warehouse management system typically each include or are associated with one or more user input devices 304, such as a keyboard, cursor, control device, touch screen, and so on and/or one or more user output devices 306, such as a display. As to the latter, layout module 302 includes software component stored in memory, and executed by a processor, which are pre-programmed to generate or determine the layout of the floor or space of the warehouse. After a layout has been generated or determined, the layout module 302 stores the layout in a layout memory 308 which is accessible by the warehouse management system 300.

The warehouse system 300 also includes an analysis module 310 which analyzes the layout of the floor or space of the warehouse using an automated process to identify the maximal packing density for the layout. When analyzing the maximal packing density for the floor, the analysis module 310 determines the optimal number of blank cells required to achieve the maximum packing density while ensuring that every pallet within the warehouse can be retrieved. Each time a new wall is placed or removed or the layout is changed or modified, the analysis module 310 re-computes for each cell the number of blanks required to retrieve a pallet for it. In order to analyze the layout, the analysis module 310 retrieves the current floor or space layout from the layout memory 308. The analysis module 310 may analyze the layout of the floor or space of the warehouse based on manual input and/or automatically. To facilitate the manual input, the analysis module 310 utilizes the one or more user input devices 304 and/or the one or more user output devices 306. As to the latter, the analysis utilizes an optimization algorithm and will be described in more detail below. The optimization algorithm determines the optimal number of blank cells required to achieve the maximum packing density while ensuring that every pallet can be retrieved based on the layout of the warehouse. The analysis module 310 includes software components stored in memory, and executed by a processor, which are pre-programmed to analyze the layout of the floor or space of the warehouse. After a layout has been analyzed, the analysis module 310 stores the results of the analysis in an analysis memory 312 which is accessible by the warehouse management system 300. It is also contemplated that the analysis module also displays the results of the analysis on the one or more user output devices 306.

The warehouse management system 300, layout module 302, and the analysis module 310 further include a communication unit for communicating with the various modules connected to a communications network. One or more system buses link components of the management system 300, layout module 302, and the analysis module 310, such as the processor, the memory, and the communication unit. The management system 300, layout module 302, and the analysis module 310 may be resident, for example, on a server linked to via the communications network. However, in some embodiments, the layout module 302 and the analysis module 310 are integrated with management system 300.

As mentioned above, to determine the optimal packing density and the minimal number of blanks cells required, the analysis unit utilizes an optimization algorithm. Specifically, the optimization algorithm is represented by the following algorithm respectively.

---

Input: a graph G, a distinguished node n* in G
Output: The number of blanks required in order to be able to move any object to n*.
1. Find the bi-connected components C = {$c_1,...,c_m$} of G using a well-known depth first search approach, starting at n*, where the components are ordered according to their LOW number (distance of component from distinguished node n*);

-continued

```
2.   Accordingly, c₁ is the component containing n*;
3.   mark (n*) ← (0,0)
4.   foreach n' ∈ c₁ such that n' is not marked do
5.       mark(n₁) = (1,0)
6.   Add c₁ to open list;
7.   while open list not empty do
8.       c ← pop(openlist);
9.       Remove c from C;
10.      foreach c' ∈ C such that there is a node n such that n ∈ c' ∩
         c do
11.          if | adj(n) | ≥ 3 then
12.              l' ← (2, max_{n'∈adj(n)}(max mark(n')));
13.          else
14.              (k₁, k₂) ← mark(n);
15.              l' ← (k₁ + 1, k₂);
16.          foreach n' ∈ c' such that n' is not marked do
17.              mark(n') = l'
18.          add c' to open list;
19.  If there are any unmarked nodes, report them as inaccessible;
20.  Output max_n maxmark(n), this is the number of required blanks;
21.  Output the markings of all nodes;
```

As used herein, a graph G is defined by a set of nodes N and a set of edges E between them. Two nodes are called connected if there is an edge between them. A graph is called connected if there are no two nodes such that there is no path (sequence of edges) between them. adj(c) denotes the set of all nodes that are connected to c. A node n is a three-way node if $|adj(n)| \geq 3$. A k-labeling for a graph G is a bijective function (a 1-to-1 mapping) $L(N) \rightarrow O \cup \{-\square 1, \ldots, -\square k\}$ where O is a set of object identifiers, and the $-\square$'s are blanks. As such, $|O|=|N|-k$. A labeling L can be moved to a labeling L', denoted $L \leadsto L'$, if either:

1. There are two distinct nodes $n_1, n_2$ such that $L(n) = L'(n)$ for all $n \in N \setminus \{n_1, n_2\}$ and $L(n_1)=L(n_2), L(n_2)=L'(n1)$, and $L(n_1)$ is a $-\square$; or
2. There is a labeling L' such that $L \leadsto L''$ and $L'' \leadsto L'$. Given a labeling L, an object o can be moved from $n_1$ to $n_2$ if $L(n_1)=o$ and there is a labeling L' such that $L'(n_2)=o$ and $L \leadsto L'$. For the remainder of the present disclosure, it is assumed that G is a connected graph.

If G is connected, then for any labeling L such that there is a node n with L(n) a blank, for any n' in G there is a labeling L' such that L' (n') is blank and $L \leadsto L'$. If G is bi-connected, then for any labeling L such that there is a node n with L(n) a blank and any node $n^* \neq n$, for any n' in G there is a labeling L' such that L' (n') is blank, $L \leadsto L'$, and $L(n^*) = L'(n^*)$. This allows the blank to be moved to any other location without affecting the location of (at least) one other node.

A labeling L with an object o such that $L(n_1)=o$ and only one blank $L(n^*)=-\square$ can be moved to L' with L' $(n_2) = o$ for $n_2 \neq n_1$ if and only if $n_1, n_2$ and $n^*$ lie in a bi-connected sub-component of G. This can be shown as follows. In the base case, $n_2$ is adjacent to $n_1$ and contains the blank. Trivially, o can only move if $n_2 = n^*$. Note that after one move of the object from $n_1$ to n', the blank is on $n_1$. In order to move it to the node in front of the object on the path to $n_2$, called n", without moving the object back to $n_1$, there needs to be a separate way from $n_1$ to n". Hence, $n_1$ and n" are on a bi-connected component.

For any node n in any component $c_i$ of G, let n' be a three-way belonging to component $c_{i'}$ with $i' < i$ and i' being the maximal number with this property, or $n' = n^*$ if no such node exists. If the optimization algorithm outputs mark(n)=$(k_1, k_2)$ then an object o can be moved from n to any node n" ∈ adj(n') if and only if there are at least $k_1$ blanks in the components $c_{i'}, \ldots, c_i$. This can be shown as follows. There are two base-cases, in both of which i=i' and hence n, n', and at least one blank (which can coincide with either of these nodes) is in the $c_i$ bi-connected component. If i=1, then $k_1=1$ and object o can be moved to n* with just one blank. Otherwise, if i>1, then $k_1 \geq 2$ and object o can be moved to n and with one more blank to n".

For the induction step, it is assumed that the result holds for i–i'=m and results in i–i'=m+1. Accordingly, n is in $c_{i'+m+1}$ and a node $n^\cap$ that is shared by $c_{i'+m}$ and $c_{i'+m+1}$ exists. Let $$\text{mark}(n^\cap) = \left(k\frac{\cap}{1}, k\frac{\cap}{2}\right).$$

By assumption, $|\text{adj}(n^\cap)| < 3$. Hence, according to the optimization algorithm, $$k_1 = k\frac{\cap}{1} + 1.$$

Object o can then be moved to $n^\cap$ if there is at least one blank in $c_{i'+m+1}$. After moving object o to $n^\cap$ there is one blank in $c_{i'+m+1}$ that cannot move to the lower components without moving object o back out of the only shared node $n^\cap$. Hence $$k\frac{\cap}{1}$$

blanks remain in the components $c_{i'}, \ldots, c_{i'+m}$.

Additionally, for any node n in any component $c_i$ of G, if the optimization algorithm outputs mark(n)=$(k_1, k_2)$ then object o can move from n to n* if and only if there are at least max$(k_1, k_2)$ blanks in the components $c_1, \ldots, c_i$. This can be shown as follows by induction over the articulation points $n_1 \ldots n_p$. In the base-case there are no articulation points in $c_1, \ldots c_i$ that are three-ways (p=0). For the induction step, it is assumed that the property holds for p and results in p+1. Object o can move from n to n" ∈ adj($n_p$) using no more than $k_1$ blanks. Since $\bar{n}_p$ is a three-way, all the blanks that remain in the components between $\bar{n}_p$ and n can be moved into the components $c_1, \ldots c'$, where c' is the component of $\bar{n}_p$. Hence, there are max$(k_1, k_2)$ blanks in $c_1, \ldots, c'$. From the optimization algorithm, $k_2$=maxmark(n"). Thus, max$(k_1, k_2)$ maxmark(n') enabling the available blanks in $c_1, \ldots, c'$ to move o from n" to n*.

In other words, a graph G and a distinguished node n* in G are inputted into the optimization algorithm. The graph G describes the layout of the floor or space of the warehouse and is defined by a set of nodes N which denote the cell locations. The distinguished node n* represents the location of the elevator or the unloading port. From this information, the optimization algorithm determines the number of blank cells required to achieve the maximum packing density while ensuring that every pallet or object within the warehouse can be retrieved. The optimization algorithm begins by determining the bi-connected components $c_1, \ldots, c_n$ of graph G. To determine the bi-connected components $c_1, \ldots, c_n$, the optimization algorithm utilizing a depth first search approach and the like which are well-known in the art. Bi-connected components exist whenever any two components are arranged with at least two paths connecting them. The bi-connected components $c_1, \ldots, c_n$ are then ordered according to their LOW number generating a set of bi-connected components C. The LOW number corresponds to the distance from the component from the distinguished node n*. For example, component $c_1$ is assigned the LOW number of one and is positioned in the location of the distinguished node n*. A component that is located four connects away from the distinguished node n* is assigned the LOW number of four.

After generating the set of bi-connected components C, the optimization algorithm determines how many blank nodes are required to retrieve a pallet or object from each specific node n and transport it to distinguished node n*. For example, it is known that $c_1$ is located at distinguished node n*. As such, the optimization algorithm marks node $c_1$ representing the distance to the distinguished node n* and the number of blank nodes required to retrieve a pallet or object from $c_1$. The optimization algorithm then processes all neighboring or adjacent components and marks those components. This marking denotes the distance to the distinguished node and the minimum of one blank node required to move a pallet from that node to the distinguished node n*. The optimization algorithm then propagates this process for the rest of the nodes of the graph G until all of the components of the graph G have been marked. After processing all of the components, the optimization algorithm outputs the optimal packing density of graph G in terms of the required number of blank nodes required to retrieve a pallet from any specific node of graph G.

The term "software", as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The term "module," as used herein, is intended to include a processor and a memory. The term "user input device," as used herein, is intended to include one or more of a mouse, a keyboard, a touch screen display, one or more buttons, one or more switches, one or more toggles, and the like. The term "user output device," as used herein, is intended to include one or more of a LCD display, an LED display, a plasma display, a projection display, a touch screen display, and the like. The term "communications network," as used herein, is intended to include one or more of the Internet, a local area network, a wide area network, a wireless network, a wired network, a cellular network, a data bus, such as USB and I2C, and the like. The term "communication unit," as used herein, is intended to include one or more of a modem, Ethernet adapter, WiFi adapter, 3G modem, a cable modem, a DSL modem, and any other adapter or modem facilitating communication with a network.

The term "processor," as used herein, is intended to include one or more of a microprocessor, a microcontroller, a graphic processing unit (GPU), an application-specific integrated circuit (ASIC), a field-programmable gate array (FPGA), and the like. Further, the above described processors, can each be variously embodied, such as by a single core processor, a dual core processor (or more generally by a multiple core processor), a digital processor and cooperating math coprocessor, a digital controller, or the like The term "memory," as used herein, is intended to include one or more of a non-transient computer readable medium; a magnetic disk or other magnetic storage medium; an optical disk or other optical storage medium; a flash memory; a holographic memory; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. In one embodiment, each of the memories above described, comprises a combination of random access memory and read only memory. Exemplary memory stores instructions for performing the exemplary method and data used and generated therein, as well operating instructions for operating the respective computer.

Figure 4:
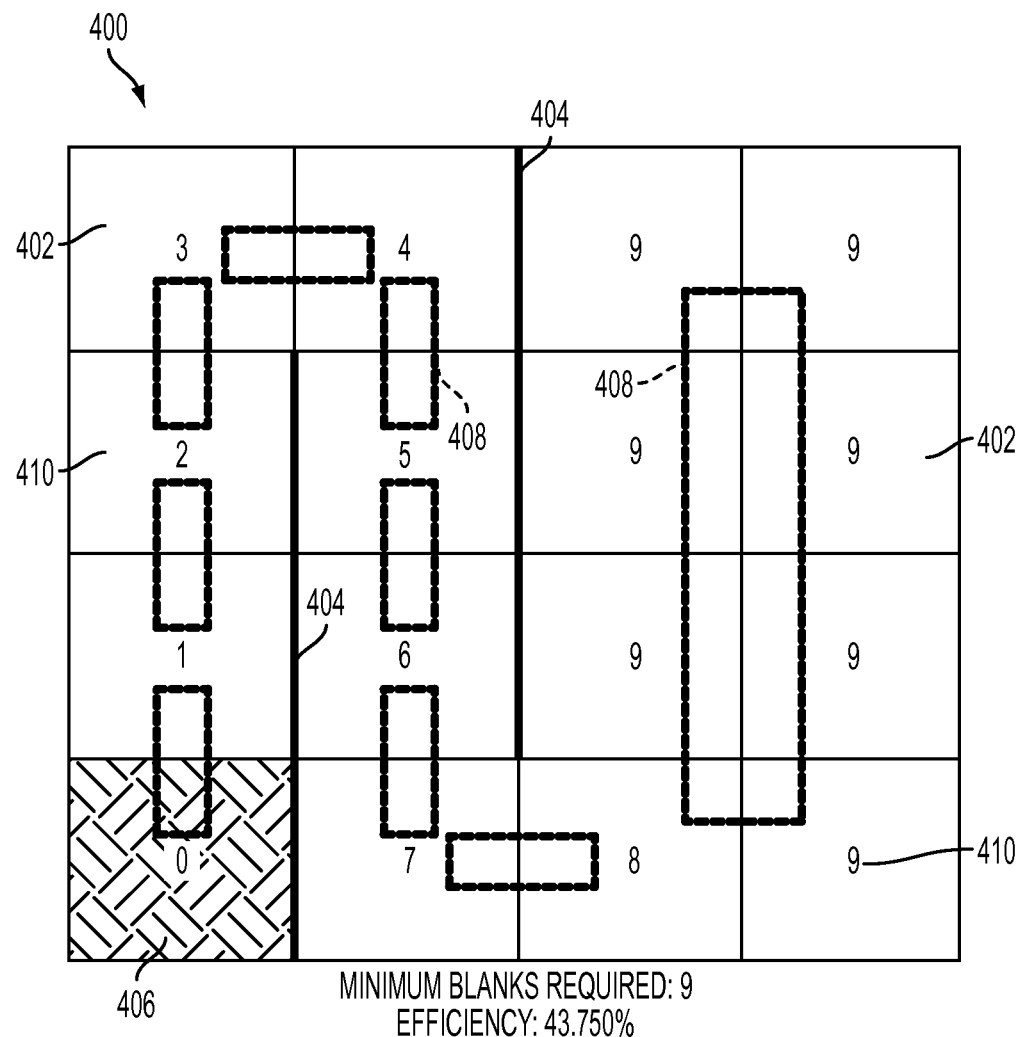
FIG. 4 is an exemplary illustration of an analyzed floor plan of a shifting-tiles automated warehouse.

With reference to FIG. 4, an analyzed exemplary floor plan 400 of a shifting-tiles automated warehouse 100 is illustrated. The floor plan 400 includes 16 cells 402 and two internal walls 404. The elevator or unloading port of the floor plan is located in cell 406. The floor plan 400 also includes polygons 408 to indicate the bi-connected components between the cells 402. As mentioned above, analysis module determines the required number of blank cells to retrieve a pallet from any particular cell. The floor plan includes markings 410 indicating the minimal number of required blanks to retrieve a pallet from each cell. As shown in the floor plan 400, for each additional cell an additional blank node is required. This is because the pallet being moved blocks the passage from the elevator to the blanks cells behind it. Once the passage opens up into a larger space, no more additional blanks are required.

Figure 5:
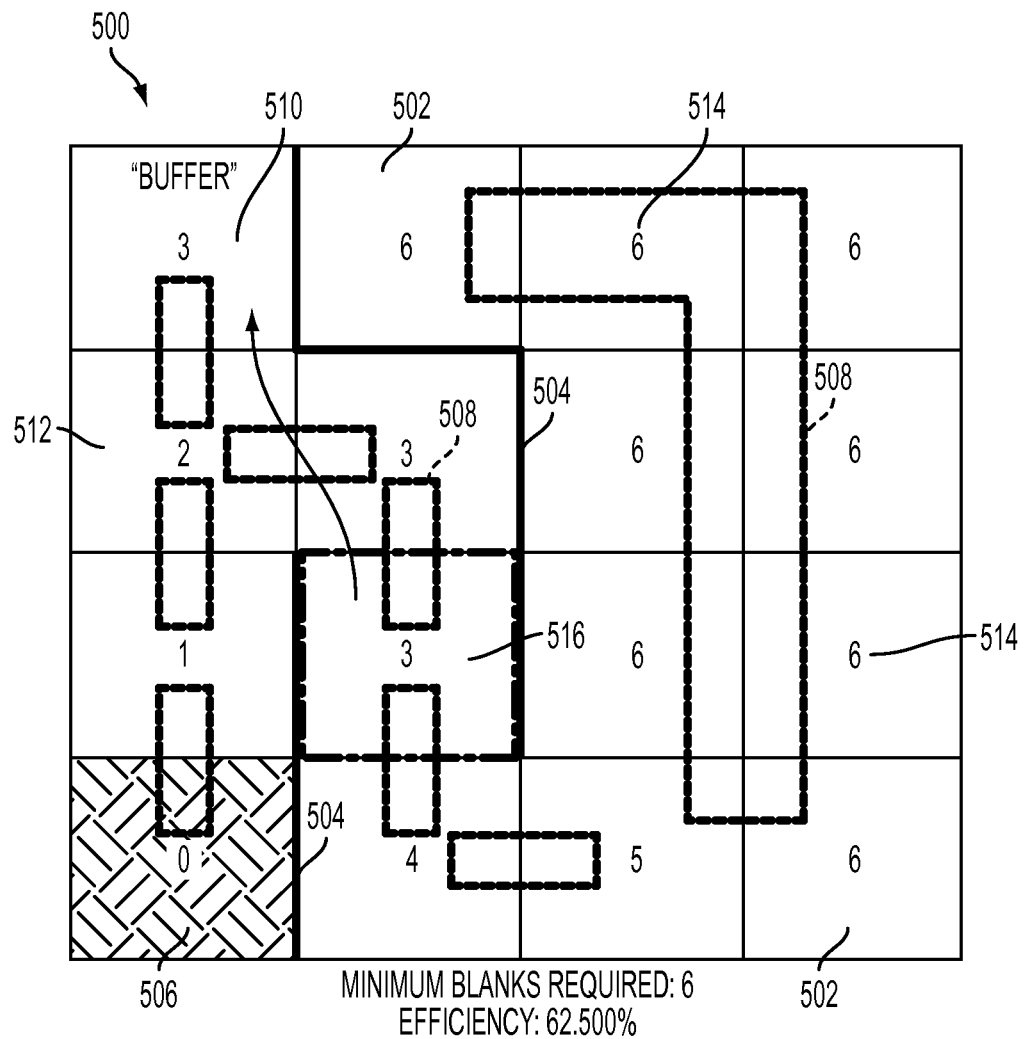
FIG. 5 is an exemplary illustration of an analyzed floor plan of a shifting-tiles automated warehouse including a buffer cell.

With reference to FIG. 5, another analyzed exemplary floor plan 500 of a shifting-tiles automated warehouse 100 is illustrated. The floor plan 500 includes 16 cells 502 and two internal walls 504. The elevator or unloading port of the floor plan is located in cell 506. The floor plan 500 also includes polygons 508 to indicate the bi-connected components between the cells 502. The floor plan 500 also includes a buffer 510 which results in a three-way cell 512. As mentioned above, analysis module determines the required number of blank cells to retrieve a pallet from any particular cell. The floor plan 500 markings 514 indicating the minimal number of required blanks to retrieve a pallet from each cell. Due to the buffer, the number of blank cells is reduced. In order to retrieve a pallet from cell 516, the pallet can first be moved into the buffer 510. Once there, its original cell can be used to store a pallet that is on route to the elevator, because the three way cell 512 is not blocked by the "to-be-retrieved" pallet itself.

Figure 6:
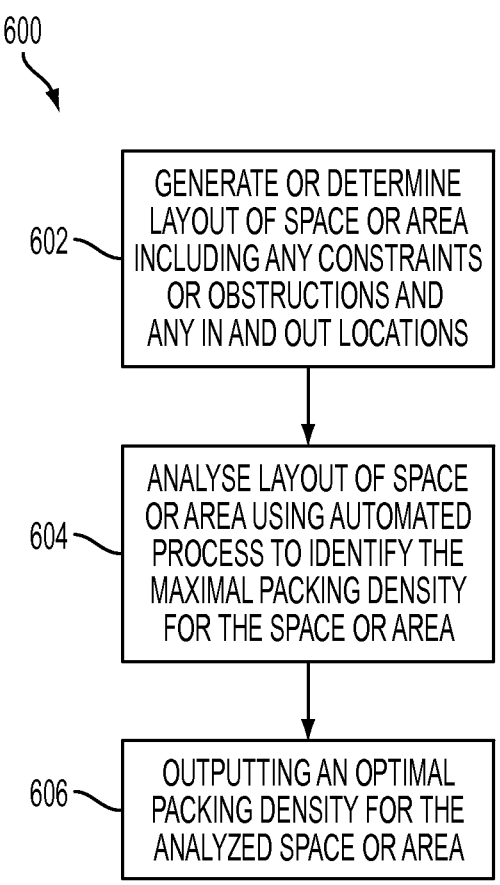
FIG. 6 is a block diagram of a method for identifying the maximal packing density of a shifting-tiles automated warehouse according to aspect of the present disclosure.

With reference to FIG. 6, a block diagram of a method 600 for identifying the maximal packing density of an automated warehouse is illustrated. In a step 602, the layout or space including any constraints or obstructions and any in and out locations are generated or determined. In a step 604, the layout of the space or area is analyzed using an automated process to identify the maximal packing density for the space or area. In a step 606, an optimal packing density for the analyzed space or area is outputted.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method for determining a maximum packing density of an automated warehouse, the method comprising:
   determining, using a computer, a layout of the automated warehouse, the layout including a plurality of cells;
   analyzing, using the computer, the layout of the automated warehouse utilizing an automated process to identify the maximum packing density of the layout; and
   displaying the maximum packing density of the layout on a display device.

2. The method according to claim 1, wherein the plurality of cells includes at least one occupied cell, at least one blank cell, and at least one transportation cell.

3. The method according to claim 2, wherein the maximum packing density includes a minimum number of blank cells required to retrieve an object from all of the occupied cells in the warehouse.

4. The method according to claim 1, wherein the step of analyzing the layout further includes:
   determining one or more bi-connected components between each of the plurality of cells and another one of the plurality of cells.

5. The method according to claim 4, wherein the step of analyzing the layout further includes:
   determining a distance between each of the bi-connected components and a transportation cell.

6. The method according to claim 5, wherein the step of analyzing the layout further includes:
   determining the minimum number of blank cells required to retrieve an object from all of the occupied cells in the warehouse from the distance between the bi-connected components and the transportation cell.

7. The method according to claim 1, wherein the automated warehouse includes shifting-tiles.

8. A computer program product comprising computer executable instructions stored in a non-transitory recording medium wherein, when executed by a computer, performs the method of claim 1.

9. A warehouse management system, the system comprising:
   a computer comprising:
   at least one processor;
   a memory storing a program of instructions for:
   a layout module which determines a layout of the automated warehouse, the layout including at least one occupied cell and at least one blank cell; and
   an analysis module which analyzes the layout of the automated warehouse to determine a minimum number of blank cells required to retrieve an object from all of the occupied cells in the warehouse.

10. The system according to claim 9, wherein the layout further includes at least one transportation cell.

11. The system according to claim 9, wherein the analysis module determines one or more bi-connected components between each of the plurality of cells and another one of the plurality of cells.

12. The system according to claim 11, wherein the analysis module determines a distance between each of the bi-connected components a transportation cell.

13. The system according to claim 12, wherein the analysis module determines the minimum number of blank cells from the distance between the bi-connected components and a transportation cell.

14. The system according to claim 9, wherein the automated warehouse includes shifting-tiles.

15. A warehouse management system, the system comprising:
   a plurality of shifting-tile cells, the plurality of cells including at least one occupied cell;
   a computer comprising:
   at least one processor;
   a memory storing a program of instructions for:
   a layout module which determines a layout of the plurality of cells; and
   an analysis module which analyzes the layout of the plurality of cells to determine a minimum number of blank cells required to retrieve an object from all of the at least one occupied cell in the warehouse.

16. The system according to claim 15, wherein the layout further includes at least one transportation cell.

17. The system according to claim 16, wherein the analysis module determines one or more bi-connected components between each of the plurality of cells and another one of the plurality of cells.

18. The system according to claim 17, wherein the analysis module determines a distance between each of the bi-connected components and a transportation cell.

19. The system according to claim 18, wherein the analysis module determines the minimum number of blank cells from the distance between the bi-connected components and the transportation cell.

* * * * *